US012010486B2

(12) United States Patent
Sorensen et al.

(10) Patent No.: US 12,010,486 B2
(45) Date of Patent: *Jun. 11, 2024

(54) DETECTION OF FEEDBACK PATH CHANGE

(71) Applicant: Eargo, Inc., San Jose, CA (US)

(72) Inventors: Bryant E. Sorensen, State College, PA (US); Brenton Steele, Victoria (AU)

(73) Assignee: Eargo, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,648

(22) Filed: Oct. 11, 2022

(65) Prior Publication Data

US 2023/0051386 A1 Feb. 16, 2023

Related U.S. Application Data

(63) Continuation of application No. 17/239,427, filed on Apr. 23, 2021, now Pat. No. 11,503,415.

(51) Int. Cl.
*H04R 25/00* (2006.01)

(52) U.S. Cl.
CPC ........... *H04R 25/453* (2013.01); *H04R 25/43* (2013.01); *H04R 25/505* (2013.01); *H04R 2225/023* (2013.01)

(58) Field of Classification Search
CPC .... H04R 25/453; H04R 25/43; H04R 25/505; H04R 2225/023
See application file for complete search history.

(56) References Cited

U.S. PATENT DOCUMENTS 6,480,610 B1 11/2002 Fang et al.
8,175,871 B2 5/2012 Wang et al.
8,355,517 B1 1/2013 Fretz
8,538,749 B2 9/2013 Visser et al.
8,553,899 B2 10/2013 Salvetti et al.
(Continued)

FOREIGN PATENT DOCUMENTS

CA 2417803 3/2002

OTHER PUBLICATIONS

Khoubrouy et al., "A New Delayless Sub-ban Filtering method for Cancelling the Effect of Feedback Path in Hearing Aid Systems", 33rd Annual Intnl Con IEEE EMBS, Aug. 30-Sep. 3, 2011, pp. 7920-7923.

(Continued)

*Primary Examiner* — Suhan Ni
(74) *Attorney, Agent, or Firm* — Law Office of Alan W. Cannon

(57) ABSTRACT

Methods and systems for signal processing an audio signal in a hearing device to detect when feedback path change occurs and controlling an adaptive feedback canceler to remove the feedback are provided. The hearing device includes a receiver and a microphone. An exemplary method includes detecting whether a tonal signal is caused by a feedback path change by estimating a product of a subband error signal and a subband output signal generated in response to a subband audio input signal; estimating a fast metric based on the estimated product and estimating a slow metric; and applying or maintaining an adaptation rate to the adaptive feedback canceler of the hearing device, wherein the adaptation rate applied or maintained is selected based upon a value of the difference between the fast and slow metrics compared to a threshold value.

20 Claims, 5 Drawing Sheets

(56) References Cited

U.S. PATENT DOCUMENTS

| | | | |
|---|---|---|---|
| 8,942,398 | B2 | 1/2015 | Salvetti et al. |
| 9,269,343 | B2 | 2/2016 | Munk et al. |
| 10,097,930 | B2 | 10/2018 | Nakagawa et al. |
| 10,341,786 | B2 | 7/2019 | Pedersen et al. |
| 2010/0017205 | A1 | 1/2010 | Visser et al. |
| 2015/0163602 | A1 | 6/2015 | Pedersen et al. |

OTHER PUBLICATIONS

Constantinedes et al., "Toward bias minimization in acoustic feedback cancellation systems", J Acoustical Society of America, Apr. 2007, pp. 1-9.
Strasser et al., "Correlation Detection for Adaptive Feedback Cancellation in Hearing Aids", IEEE Signal Processing Letters, Vo. 23, No. 7, Jul. 2016, pp. 979-983.
Puder et al., "Decorrelation Measures for Stabilizing Adaptive Feedback Cancellation in Hearing Aids", 2017 25th European Signal Processing Conference, 2017, pp. 613-617.
Konsgen et al., Feedback cancellation in Hearing Aids. Spring, 2006, Aalborg University, pp. 1-101.
Spriet et al., "Feedback control in hearing aids", Sprionger Handbook of Speech Processing and Speech Communication, Chap. 48, Part H, 2007, pp. 1-28.
Guo, "Analysis, Design, and Evaluation of Acoustic Feedback Cancellation Systems for Hearing Aids", Ph. D. Thesis, Aalborg University, 2012, pp. 1-224.
Tran et al., "Improved Practical Variable Step-Size Algorithm for Adaptive Feedback Control in Hearing Aids", IEEE, 2016, pp. 1-8.
Mishra, "Acoustic Feedback Cancellation Techniques for Hearing Aid Applications in Noisy Environments", Ph.D. Thesis, U. Texas at Dallas, May 2018, pp. 1-54.
Vincen-Bueno et al., "Modified LMS-Based Feedback-Reduction subsystems in Digital Hearing Aids Based on WOLA Filter Bank", IEEE Trans Instrum. and Meas., Vo.. 58, No. 9, Sep., 2009, pp. 3177-3190.
Guo et al., "On the Use of a Phase Modulation Method for Decorrelation in Acoustic Feedback Cancellation", 20th Euriop. Signal Proceess. Conf., Aug. 27-31, 2012, pp. 2000-2004.
Guo et al., "On the Periodically Time-Varying Bias in Adaptive Feedback Cancellation Systems with Frequency Shifting", IEEE, 2016, pp. 539-543.
Tran et al., "Proportionate NLMS for Adaptive Feedback Control in Hearing Aids", IEEE, 2017, pp. 211-215.
Lee et al., "Robust Adaptive Feedback Canceller Based on Modified Pseudo Affine Projection Algorithm", IEEE, 2011, pp. 3760-3763.
Rombouts et al., "Robust and Efficient Implementation of the PEM-AFROW Algorithm for Acoustic Feedback Cancellation", J Audio Eng. Soc., vol. 55, No. 11, Nov. 2007, pp. 955-966.
Schepker, "Robust Feedback Suppression Algorithms for Single- and Multi-Microphone Hearing Aids", Thesis, Dec. 19, 2017, pp. 1-234.
Rotaru et al., "A Variable Step Size Modified Decorrelated NLMS Algorithm for Adaptive Feedback Cancellation in Hearing Aids", Proc. of ISETC, 2012. pp 263-266.
Shen et al., "A New Variable Step-Size Algorithm on Acoustic Feedback Suppression for Digital Hearing Aids", IEEE, 2014, pp. 171-175.
Kim et al., "Sign subband adaptive filter with 11-norm minimisation-based variable step size", Electronics Letters, Vo. 49, No. 21, Oct. 10, 2013, pp. 1325-1326.
Spriet et al., "Adaptive feedback cancellation in hearing aids with linear prediction of the desired signal", IEEE Trans. Signal Porc. , vol. 53, No. 10, Oct. 2005, pp. 1-35.
Strasser, "Adaptive Feedback Cancellation in Hearing Aids", Thesis, 2017, pp. 1-172.
Strasser et al., "Adaptive Feedback Cancellation for Realistic Hearing Aid Applications", IEEE/AC Trans Audio, Speech and Lang. Proc., vol. I 23, No. 12, Dec. 2015, pp. 2322-2333.
Siqueira et al., "Subband Adaptive Filtering Applied to Acoustic Feedback Reduction in Hearing Aids", Proceedings of the Asilomar Conference on Signals, Systems, and Computers, 1996, pp. 1-5.
Strasser et al., "Sub-Band Feedback Cancellation with Variable Step-sizes for Music Signals in Hearing Aids", IEEE Intl. Conf Acoust, Speech and Signal Proc., 2014, pp. 8207-8211.
Albu et al., "The Hybrid Simplified Kalman Filter for Adaptive Feedback Cancellation", IEEE, 2018, pp. 45-50.
Wang et al., "An Effective Acoustic Feedback Cancellation Algorithm Based on the Normalized Sub-Band Adaptive Filter", IEICE Trans. Inf. & Syst. , vol. E99-D, No. 1, Jan. 2016, pp. 288-291.

DETECTION OF FEEDBACK PATH CHANGE

This application is a continuation of co-pending application Ser. No. 17/239,427, filed Apr. 23, 2021, which application is hereby incorporated herein, in its entirety, by reference thereto and to which we claim priority under 35 U.S.C. Section 120.

FIELD OF THE INVENTION

This disclosure relates to detection of the onset of feedback in feedback cancellation subsystems of acoustic systems, and more particularly to such for feedback cancellation subsystems in hearing devices.

BACKGROUND OF THE INVENTION

Acoustic feedback occurs because the output speaker signal from an audio system providing amplification of a signal picked up by a microphone is partly returned to the microphone via an acoustic coupling through the air or other media. The part of the output signal returned to the microphone is then re-amplified by the system before it is re-presented at the speaker, and again returned to the microphone. As this cycle continues, the effect of acoustic feedback becomes audible as artefacts, squealing, etc. when the system becomes unstable. The problem appears typically when the microphone and the loudspeaker are placed closely together, as e.g. in hearing aids or other audio systems. Some other classic situations with feedback problems are telephony, public address systems, headsets, audio conference systems, etc. Unstable systems due to acoustic feedback tend to significantly contaminate the desired audio input signal with narrow band frequency components, which are often perceived as squeal or whistle.

A variety of feedback cancellation methods have been described to increase the stability of an audio processing system. The acoustic feedback path of an audio processing device, e.g. a listening device, e.g. a hearing aid, may vary over time. Adaptive feedback cancellation has the ability to track acoustic feedback path changes over time and is e.g. based on an adaptive filter comprising a finite impulse response filter (variable filter part of the adaptive filter) to estimate the feedback path. The filter weights are updated over time (e.g. calculated in an update (algorithm) part of the adaptive filter). The filter update may be calculated using stochastic gradient algorithms, including some form of the Least Mean Square (LMS) or the Normalized LMS (NLMS) algorithms A drawback of these methods is that the estimate of the acoustic feedback path (provided by the adaptive filter) will be biased, if the input signal to the system is not white (i.e. if there is autocorrelation) because the estimate is made in a ‘closed loop’. This means that the anti-feedback system may introduce artefacts when there is autocorrelation (e.g. tones) in the input.

Feedback in acoustic systems, especially hearing aids, is prevalent because of air conduction paths that exist between the output of the system and its input. Other physical paths can also cause feedback; for example a loose package may be subject to transmitting vibrations from output back to the input. When the system provides some gain to the acoustic input signal, the corresponding output then can loop back into the input via air conduction or other acoustic or physical means, creating a reinforcing recursion known as feedback. To the hearing aid user, this can be audible as a loud squeal which persists unless cancelled by some method.

Most hearing aids use electronic means to provide an anti-phase signal that adapts to the feedback, attempting to cancel it. Rather than manipulating the gain, feedback cancellation (FBC) algorithms introduce an additional signal to cancel out the acoustic leakage. When feedback is detected at the output of the hearing aid, a cancellation signal is generated to mimic the feedback. The feedback is then cancelled by subtracting the cancellation signal from the input.

A negative side-effect of some adaptive FBC algorithms is the occurrence of entrainment artifacts. Entrainment occurs when the feedback canceller mistakenly attempts to cancel a tonal input to the hearing aid. This results in the addition of a tone to the original by the hearing aid itself when the input tonal signal changes or stops. The hearing aid user may report hearing the additional tone, a tone or squeal or whistling after the original sound has stopped, or a modulation-type distortion of the sound.

There is a need in the art for improved feedback cancellation to avoid unwanted artifacts generated in existing feedback cancellation systems at the time the feedback path changes, while differentiating between tonal inputs and feedback signals in order to reduce entrainment.

There is a need in the art for improved feedback cancellation that can better distinguish feedback path changes from changes due to tonal sounds such as music, tonal parts of speech, pure tones (beeps or alarms) and impulsive sounds like clicks and pops.

SUMMARY OF THE INVENTION

According to one aspect of the present invention, a method of signal processing an audio signal in a hearing device is provided to detect when feedback path change occurs and control an adaptive feedback canceler to remove the feedback. The hearing device includes a receiver and a microphone. This method includes: detecting whether a tonal signal is due to feedback onset by estimating a product of a subband error signal and a subband output signal generated in response to a subband audio input signal; estimating a fast metric based on the estimated product and estimating a slow metric; and applying or maintaining an adaptation rate to the adaptive feedback canceler of the hearing device, wherein the adaptation rate applied or maintained is based upon a value of the difference between the fast and slow metrics.

In at least one embodiment, the adaptation rate applied or maintained is selected based upon a value of the difference between the fast and slow metrics compared to a threshold value.

In at least one embodiment, it is detected that feedback path change occurs when the difference between the fast metric and the slow metric is greater than or equal to the threshold value.

In at least one embodiment, the adaptation rate applied when it is detected that feedback path change occurs is a relatively fast adaptation rate.

In at least one embodiment, the adaptation rate applied when it is detected that feedback path change occurs is proportional to the value of the difference between the fast and slow metrics.

In at least one embodiment, it is detected that feedback path change is considered to not occur when the difference between the fast metric and the slow metric is less than the threshold value.

In at least one embodiment, the adaptation rate applied when it is detected that feedback path change does not occur is a relatively slow adaptation rate.

In at least one embodiment, the product of a subband error signal and a subband output signal generated in response to a subband audio input signal is estimated for each subband of the audio signal having been split into a plurality of subbands.

In at least one embodiment, the product of a subband error signal and a subband output signal generated in response to a subband audio input signal is estimated for less than a total number of a plurality of subbands of the audio signal having been split into the plurality of subbands.

In at least one embodiment, the method further includes reducing gain applied to at least one of the audio signal or at least one of the subband audio signals to reduce squeal associated with the onset of feedback path change.

In at least one embodiment, the adaptation rate is applied for a predetermined time after detection of feedback path change to ensure complete adaptation of the adaptive feedback filter of the adaptive feedback canceler to cancel the feedback.

According to an aspect of the present invention, a method of signal processing an audio signal in a hearing device to detect when feedback path change occurs and controlling an adaptive feedback canceler to remove the feedback is provided, wherein the hearing device includes a receiver and a microphone, and the method includes: detecting whether a tonal signal is caused by feedback path change by estimating a product of a subband error signal and a subband output signal generated in response to a subband audio input signal; estimating a metric based upon the estimated product; and applying or maintaining an adaptation rate to the adaptive feedback canceler of the hearing device, wherein the adaptation rate applied or maintained is based on a value of the metric.

In at least one embodiment, the metric is used to gradate a value of the adaptation rate by scaling the value of the adaptive rate according to a value of the metric.

In at least one embodiment, the metric is estimated by estimating a fast metric based on the estimated product and estimating a slow metric, and taking the difference between the fast metric and the slow metric.

In at least one embodiment, estimation of the slow metric is not performed when the absolute value of the fast metric exceeds a predetermined value.

In at least one embodiment, an adaptation rate is applied to the adaptive feedback canceler that is faster than a currently applied adaptation rate, when it is detected that the tonal signal is caused by a feedback path change, and wherein the faster adaptation rate is applied for a predetermined time after it is detected that the tonal signal is caused by the feedback path change to ensure complete adaptation of an adaptive feedback filter of the adaptive feedback canceler to cancel the feedback.

According to an aspect of the present invention, a hearing device is provided that includes: a microphone; a receiver; and a processor connected to the microphone and said receiver, the processor configured to receive audio signals from the microphone and process the audio signals and the receiver configured to provide output signals to a user, the processor is further configured to: detect whether a tonal signal is caused by a feedback path change by estimating a product of a subband error signal and a subband output signal generated in response to a subband audio input signal split from the audio signals; estimate a metric based upon the estimated product; and apply or maintain an adaptation rate to an adaptive feedback canceler of the hearing device, wherein the adaptation rate applied or maintained is based on a value of the metric.

In at least one embodiment, the hearing device is a hearing aid.

In at least one embodiment, the hearing aid is a completely-in-the-canal (CIC) hearing aid.

In at least one embodiment, the metric is estimated by estimating a fast metric based on the estimated product and estimating a slow metric, and taking the difference between the fast metric and the slow metric.

In at least one embodiment, the metric is used to gradate a value of the adaptation rate by scaling the value of the adaptation rate according to a value of the metric.

In at least one embodiment, it is detected that feedback path change occurs when the difference between the fast metric and the slow metric is greater than or equal to the threshold value.

In at least one embodiment, the adaptation rate applied when it is detected that feedback path change occurs is a relatively fast adaptation rate.

In at least one embodiment, it is detected that feedback path change occurs when the difference between the fast metric and the slow metric is greater than or equal to a predetermined threshold value; and wherein the adaptation rate applied when it is detected that feedback path change occurs is a relatively fast adaptation rate relative to an adaptation rate that is currently being applied.

In at least one embodiment, the relatively fast adaptation rate is applied for a predetermined time after detection of feedback path change.

These and other advantages and features of the invention will become apparent to those persons skilled in the art upon reading the details of the methods, systems and devices as more fully described below.

BRIEF DESCRIPTION OF THE DRAWINGS

Various embodiments of the present invention are illustrated by way of example in the figures of the accompanying drawings. Such embodiments are demonstrative of the present invention and are not intended to be limiting as to the only embodiments possible, as the invention is defined by the appended claims, as supported by the specification and drawings.

DETAILED DESCRIPTION OF THE INVENTION

Figure 1:
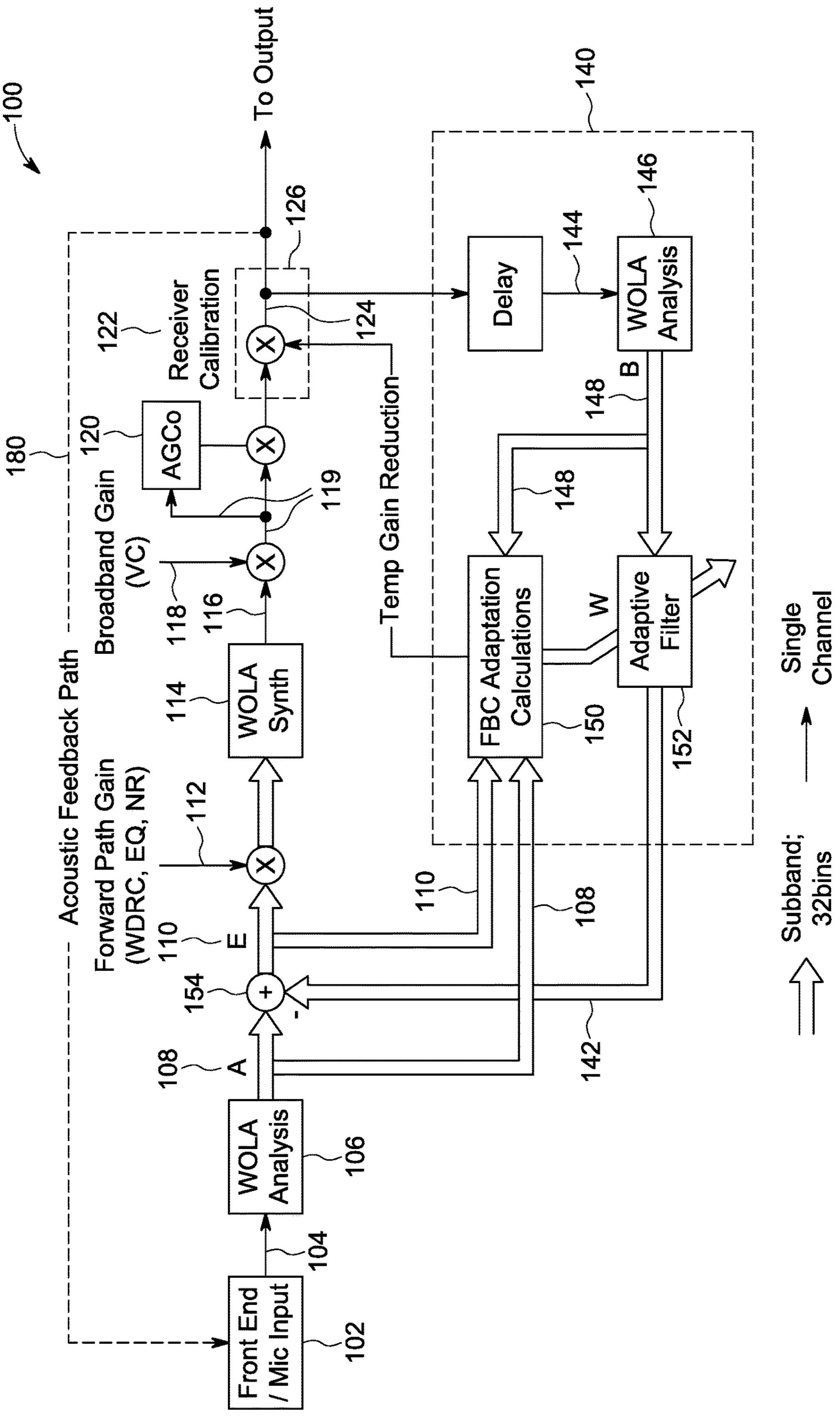
FIG. 1 illustrates an acoustic system with an adaptive feedback cancellation filter according to an embodiment of the present invention.

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms “a”, “an”, and “the” include plural referents unless the context clearly dictates otherwise. Thus, for example, reference to “a signal” includes a plurality of such signals and reference to “the subband” includes reference to one or more subbands and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

The present invention may be employed in a variety of devices, including, but not limited to, hearing devices. The specification describes hearing devices using hearing aids as an example. However, it is understood by those of ordinary skill in the art upon reading and understanding the present disclosure, that the present invention may be employed in hearing devices including, but not limited to headsets, earbuds, speakers, cochlear implants, bone conduction devices, and personal listening devices. Hearing devices in which the present invention may be employed include completely in the canal hearings aids, in the canal hearing aids, receiver in canal hearing aids, invisible in canal hearing aids and behind the ear hearing aids.

DEFINITIONS

The term “entrainment” as used herein refers to an occurrence when a feedback canceller mistakenly attempts to cancel a tonal input to an audio processing system. This results in the addition of a tone to the original input signal to the audio processing system, especially when the tonal input then goes away.

An “audio processing system” as used herein is a system that includes a microphone and a receiver or speaker, an adaptive feedback canceler for removing feedback, as well as processing electronics for amplification of signals. Examples of audio processing systems include, but are not limited to: listening devices, hearing aids, telephony, public address systems, headsets, audio conference systems, etc.

The terms “tonality” “tonal signal”, “tonal input” and “tonal”, as used herein refer to audio signals that are larger in signals that are dominated by single-frequency components having slowly varying (or non-varying) frequencies (tones), and smaller in signals that are not comprised of such components. The terms “bins”, “channels”, “frequency bins” and “binned signals”, as used herein, refer to subbands of a signal resulting from splitting the signal from the time domain to frequency domain, or to the joint time-frequency domain, wherein each bin (i.e., subband) is characterized by a different frequency range than the other resulting bins. The terms “bin” or “bins” are used interchangeably with the terms “channel” or channels, respectively herein.

The term “feedback”, as used herein, refers to the reflection of the output signal back into the input, in a recursive manner, such that the audio processing system goes unstable at some frequency. It is also referred to as ‘positive loop gain’ which includes an acoustic path from the output signal back to the input signal, and the signal processing within the audio processing system.

The term “feedback path”, as used herein, refers to combination of the physical path between the audio output of the audio processing system and the system’s audio input wherein sound waves or sound energy can be transferred, and the signal processing path of the audio processing system from audio input to audio output.

The term “feedback path change”, as used herein, refers to a disturbance or alteration, either physical or electronic, or both of the feedback path from its quiescent, or previous, state, which is significant enough to cause audio artifacts due to the feedback cancellation by the audio processing system not matching the feedback path.

The terms “audio artifact” and “audio artifacts” as used herein, refer to sound samples or values which contain undesired content resulting from computing processing or manipulation on the sound. These artifacts can be detected by further processing of the sound samples, by comparing them to the original sound sample, or to ideal processing results. Audio artifacts can also be subjectively noted as undesirable by a person who listens to the sound signal.

The term “onset of feedback” can refer both to the system transitioning from no feedback to some feedback, and to a change in the feedback path. In both cases, prior to the onset, the feedback cancellation will not have adapted and hence needs to change. For the purposes of this document, "onset of feedback" and "feedback path change" are synonymous.

Digital hearing aid devices with an adaptive feedback canceller are constantly monitoring the audio signal from the devices' input, and adapting to the feedback signal in that input to provide anti-phase cancellation. When properly functioning, these devices tend to settle to a quiescent state where the feedback path is cancelled. However, sudden changes to the feedback path can occur, for example due to head movement or bringing a phone or hand to the ear. These feedback path changes can occur more quickly than the nominal adaptation speed of the feedback canceller, which can result in undesirable feedback artifacts until the feedback canceller can adapt to the changed feedback path. In this case, it is desirable for the speed of adaptation to change so that the feedback canceller can quickly adjust to the new feedback path and minimize the duration or loudness of the artifacts. It is highly desirable to have automatic feedback path change detection in the feedback cancellation algorithm which can adjust the speed as needed.

However, digital hearing aids with adaptive feedback cancellation usually perform poorly from artifacts when the input audio signal to the microphone changes suddenly, and is quasi-periodic or strongly self-correlated over short time scales. For example, music input might change in amplitude, or a spoken word might have more emphasis. The feedback canceller may use an adaptive technique that exploits the correlation between the microphone signal and the delayed receiver signal (the feedback signal) to update a feedback canceller filter to model the external acoustic feedback path. A self-correlated input signal results in an additional correlation between the receiver and the microphone signals. Adaptive feedback cancellers that were available prior to the present invention often find it difficult to differentiate this correlation between the receiver and the microphone signals from the natural correlation between the receiver and the acoustic feedback signals, and incorporate characteristics of the self-correlated input signal in their models of the external acoustic feedback path. This can be generally the case, and is an important consideration to make when looking at feedback path changes. This results in artifacts, called entrainment artifacts, due to non-optimal modeling of the external acoustic feedback path. The entrainment-causing self-correlated input signal and the affected feedback canceller filter of the prior art systems are called the entraining signal and the entrained filter, respectively.

The present invention provides a solution for detecting feedback path changes, while also differentiating between the correlation between the receiver and the microphone signals from the natural correlation between the receiver and the acoustic feedback signals.

Entrainment artifacts in audio systems include squealing sounds that can be very annoying to the listener. As noted, such entrainment artifacts may occur with input sounds such as music, tonal parts of speech, beeps, alarms, rings, clicks, pops, etc. Such entrainment artifacts can occur when the input and output signal are strongly self-correlated, which can occur with the examples provided above, as well as others. Self-correlated signals are self-similar over a short time span, that is, similar to slightly delayed versions of themselves. If the signal is similar to a delayed version of itself, then at the hearing aid input, it is difficult for the feedback canceler to distinguish new signal from feedback. The simplest case of this self-similarity is a tonal, or pitched signal. A periodic signal is identical to versions of itself delayed by the pitch period, and thus tonal signals, like music, are troublesome for adaptive feedback cancelers.

The present invention discloses, among other things, apparatus and methods for signal processing an input signal in a hearing device to detect the onset of feedback, and/or to detect the onset of feedback path changes, and to mitigate the feedback via parameters applied to a feedback cancelation subsystem. Various embodiments include a method of signal processing an input signal in a hearing device to mitigate entrainment, the hearing device including a receiver and a microphone. The method includes detecting whether a tonal signal includes feedback by estimating a product of a subband error signal and a subband output signal generated in response to the input signal; estimating a fast parameter based on the estimated product and estimating a slow parameter; and applying an adaptation rate to an adaptive feedback canceler of the hearing device, wherein the adaptation rate is selected based upon the value of the difference between the fast and slow parameters compared to a threshold value. In at least some embodiments, it is detected that feedback path change exists when the difference between the fast parameter and the slow parameter is greater than or equal to a selectable threshold value. The adaptation rate applied when it is detected that feedback path change exists is a relatively fast adaptation rate that is faster than the adaptation rate that is applied when no feedback path change is detected. In at least some embodiments, it is detected that feedback path change does not exist when the difference between the fast parameter and the slow parameter is less than the selectable threshold value. The adaptation rate applied when it is detected that feedback path change does not exist is a relatively slow adaptation rate.

The present invention increases overall sound quality and/or improves feedback cancellation performance by proactively detecting when the onset of feedback or onset of a feedback path change occurs and adjusting the adaptation rate of the feedback cancellation subsystem so that the rate is faster when feedback is present, and slower when it is not. This modification of the adaptation rate parameters helps mitigate entrainment for tones susceptible thereto, when no feedback is present. Thus the present invention mitigates entrainment in adaptive feedback cancellation while minimizing degradation of the hearing aid output, thereby improving sound quality for tonal inputs such as speech and music and other inputs susceptible to entrainment, as described above.

The present invention subject matter uses detection of feedback path changes which includes detection of whether a tonal signal is feedback to determine an adaptation rate to be applied to an adaptive feedback canceler of a hearing device. As noted above, tonality can be defined as a quantity that is larger in signals that are dominated by single-frequency components having slowly varying (or non-varying) frequencies (tones), and smaller in signals that are not comprised of such components. A product is estimated of a subband error signal and a subband output signal generated in response to an audio input signal. A fast parameter based on the estimated product is estimated and a slow parameter is estimated. An adaptation rate is applied to an adaptive feedback canceler of the hearing device, wherein the adaptation rate is selected based upon the value of the difference between the fast and slow parameters compared to a threshold value.

When there is no feedback path change detected, the adaptation rate is applied to be a value which results in a relatively slow adaptation rate, so as to mitigate a tendency toward entrainment when tonal signals not due to feedback are present. However when a feedback path change is detected, the adaptation rate is applied to be a value which results in a relatively fast adaptation rate, so that the feedback is more rapidly canceled.

FIG. 1 illustrates an acoustic system 100 with an adaptive feedback cancellation subsystem 140 including adaptive feedback cancellation filter 152 according to an embodiment of the present invention. At the front end of the system, an audio input is provided such as through a microphone 102, for example. The audio input is digitized (e.g., using an analog-to-digital converter) into a sequence of digital audio samples and the digital audio samples are split into a plurality of subband signals. The audio input signal 104 may processed, for example, by WOLA (weighted, overlap add) method 106 to break the signal up into frequency bins. The splitting of the input time-domain signal into frequency bins can alternatively be accomplished by other means, including but not limited to a Short-Time Fourier Transform (STFT), or a time domain filter bank. In at least one example the signal is broken into thirty-two frequency bins. However, this is not limiting, as more or fewer bins could be made from splitting/breaking up the signal. The dual parallel lines (open arrows) in the diagram illustrate the operations that are performed on all the bins in parallel, while the single lines are drawn for operations performed on a single channel.

The subband signals are processed separately as described in the following. Feedback canceller calculations per subband are performed. Processing includes calculation of a metric based on the cross-correlation products of output B and error E signals, to detect whether feedback is present. An adaptation rate is selected or maintained, based on the identification using the metric as to whether or not feedback is present. The coefficients W for the adaptive feedback cancellation filter 152 are updated using the selected or maintained adaptation rate. The updated feedback cancellation function is applied to the delayed output signal 148 and fed back 142 to be subtracted from the input signal at 154 in FIG. 1, and this process is iteratively applied over time, to eliminate or substantially reduce feedback so that the output signal 124 does not contain significant feedback.

The input in the subband domain is labeled “A”, as shown by reference number 108 in FIG. 1. The filtered feedback signal 142 is subtracted from the input 108 to create the error signal E (reference number 110). A forward path gain can be applied at 112 using various algorithms, such as WDRC (Wide Dynamic Range Compression), EQ (Equalization), NR (Noise Reduction), for example. An inverse operation to that performed in 106 is performed at 114 (by WOLA synthesis, for example) to combine the amplified signals into a single signal 116 in the time domain. Amplification to the time domain signal can be applied at 118 (broadband gain). Automatic Gain Control at Output (AGCo) can be applied to the amplified signal 119 just prior to output, where a smoothed gain is calculated based on the input to the AGCo 120, and that gain is applied, such that the output signal does not exceed a desired threshold, so as to ensure that the output is not too loud for the listener. Receiver Calibration at 122 refers to gain that can be applied to perform a fine-tuning of the signal level to compensate for physical or electrical differences between hearing aid receivers (or output speakers in other audio processing systems) resulting during production. The output signal 124 is converted to an analog signal (e.g., by a digital-to-analog converter) and is outputted, such as by receiver 126, for example, to the user/listener (To Output).

The output signal 124 is also inputted to the adaptive feedback cancellation filter 140. The signal 124 is processed with a time delay 142 to correspond to or approximate, in a gross sense, the minimum or initial time that it would take an audio signal 180 to feed back from the receiver 126 to the microphone 102, so that the delayed signal 144, when processed by the feedback cancellation filter 152, is generally in phase with a feedback audio signal, if one is occurring. The delayed signal 144 is processed at 146, such as by WOLA Analysis (or, by other analysis means, as mentioned above), to break it into frequency bins, like the processing that occurs at 106.

The binned signals 148 (delayed output signals B) are inputted to processor 150 where feedback cancellation adaptation calculations are performed. These calculations are described in greater detail below. The cross-correlation of the B signals 148 and E signals 110 are calculated and, the adaptive filter coefficients W are adjusted by the adaptive filter 152, with the amount of change in the filter coefficients W being directly related to the strength of the cross-correlation. Over time this drives the W coefficients, so that, when applied to the signal 142, the adapted signal 142 at 154 minimizes the correlation between B and E. As described below the products of the B 148 and E 110 subband signals are summed and used to create a metric which detects whether feedback is present. Depending upon whether or not feedback is present, an adaptation rate is modified or maintained for calculation of the updated coefficients W of the wideband feedback cancellation function that is used by the adaptive filter 152 for modifying signal 142 to reduce/eliminate feedback when present. Input A (108) is used for normalization calculations as described below with regard to equation (6).

Figure 2:
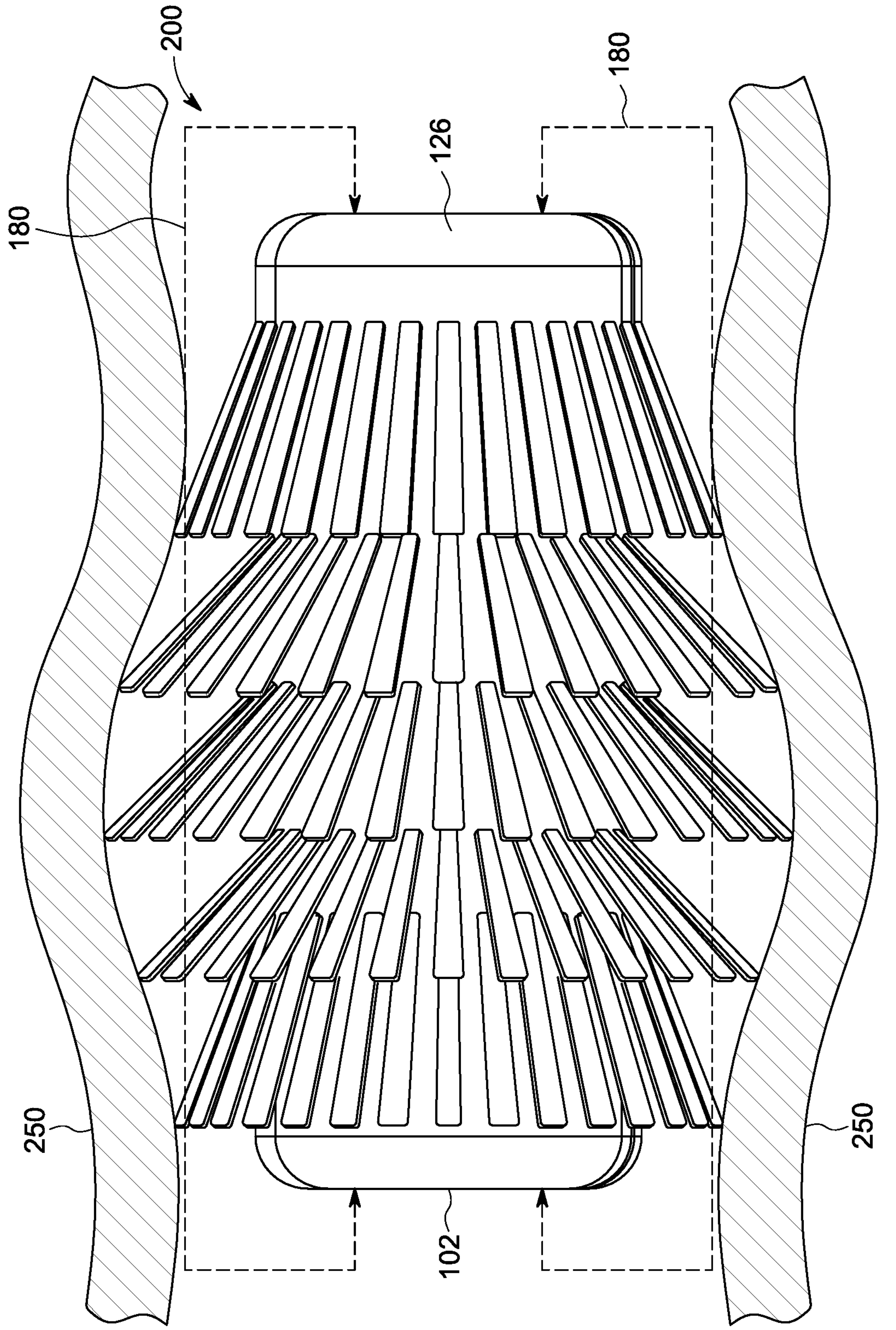
FIG. 2 illustrates a generalized example of a completely in the ear hearing aid installed in the ear canal of a user and illustrating feedback pathways.

FIG. 2 illustrates a generalized example of a completely in the ear hearing aid 200 installed in the ear canal 250 of a user. The hearing aid 200 includes an input device 102, such as a microphone positioned in the ear canal to receive sounds coming from the opening in the ear canal 250 that leads outside of the user. An output device 126, such as a receiver of the hearing aid is positioned to deliver sound toward the ear drum at the opposite end of the ear canal 250. Sounds picked up by the microphone 102 are processed and transmitted as audio signals by receiver 126. As noted previously, feedback paths 180 are provided by the gaps or open air spaces between the hearing aid 200 and the walls of the ear canal 250, so that sound can travel from the receiver 126, through the gaps and to the microphone 102.

The feedback canceller calculations per subband are calculated by the processor 150 by the following:

$$E_k(n) = A_k(n) - \sum_d B_k(n-d) \cdot W_k(n)(d) \tag{1}$$

Where:

- $A_k(n)$ is the input signal in subband k at time n. It is converted from the time-domain signal which is produced by the input device 102 (microphone);
- $E_k(n)$ is the error signal in subband k at time n;
- $B_k(n)$ is the output signal in subband k, delayed and fed back into the feedback canceller algorithm;
- $W_k(n)(d)$ are the adapted feedback cancellation coefficients in subband k at time n, for d=0, 1, . . . , M−1 (M total coefficients per subband).

The Error (‘E’) signals 110 are then processed with the hearing aid algorithm that is provided with the hearing aid 200 and is not described in detail here. As noted previously, the subbands are then synthesized or combined back down at 114 to create the time domain hearing aid output sent to the output transducer (e.g., receiver 124). There is generally additional processing done on the time domain signal as well. This output is then fed back for use in the FBC system 140, delayed, with the delay amount set programmatically to approximately match the minimal or initial acoustic delay of the physical acoustic feedback path. The delayed fed-back output is then converted back into the subband domain B at 146.

The coefficients W are updated using the standard normalized least-mean-square (NLMS) algorithm as follows:

$$W_k(n \mid 1)(d) = \alpha \cdot W_k(n)(d) \mid \mu(n) \cdot \frac{E_k(n) \cdot B_k^*(n-d)}{\|B_k\|^2 + \delta} \tag{2}$$

where:

- the asterisk * denotes complex conjugation of the subband signal;
- the denominator of the last term is the magnitude squared of the B values for that subband, considered as a vector. It is called the normalization value for the coefficient adaptation;
- the α value is a leakage factor which can be applied to the previous coefficient value;
- the δ value is a bias term which prevents divide by zero; it can also be thought of as a cap on the amount of normalization;
- the rate of adaptation is controlled by μ(n), which can be time varying;
- the value of ‘d’ is generally small, possibly 3 or 4. However, in some implementations, every other coefficient is left at zero, and only every other coefficient is adapted. In this case, d=0 to M−1, but the coefficients only are non-zero for d=0, 2, 4, . . . This can be done to extend the time duration reach of the FBC filter 140.

An alternative to equation (2) above seeks to reduce the contribution of impulsive signals at the input to the normalization, as:

$$W_k(n \mid 1)(d) - \alpha \cdot W_k(n)(d) + \mu(n) \cdot \frac{E_k(n) \cdot B_k^*(n\ d)}{\|B_k + E_k\|^2 + \delta} \tag{3}$$

The adaptation rate μ(n) should be applied in the above equations as a relatively small value (i.e., so that the adaptation rate is relatively slow) when there is no feedback in the system. By using a relatively slow adaptation rate, this mitigates the tendency of the E·B product to track tonal signals such as music, tonal parts of speech, pure tones (beeps or alarms), and impulsive sounds like clicks and pops. This tendency of the E·B product is due to the high amount of correlation between E and B for such signals. If the E·B product tracks these tonal (i.e. correlated) signals, the feedback canceller will experience an effect known as entrainment, which results in undesirable audio artifacts. The feedback canceller will start to follow these tones; when the tones go away from the input, the feedback canceller in such case may inject the inverse-phase of the entrained tone for some time after. The use of a relatively slow adaptation rate can prevent such entrainment and the adverse effects thereof.

However, when feedback is present, and especially for feedback path changes, it is desirable to apply μ(n) as a value that causes the adaptation rate to be relatively fast. A fast adaptation means that the feedback will be canceled sooner than if a relatively slow adaptation rate is applied, as this allows rapid adaptation of the feedback coefficients to the feedback signal, resulting in faster cancellation of the undesired feedback.

The present invention detects when a feedback path change occurs in a hearing device such as a hearing aid system and automatically modifies or maintains an adaptation rate of a feedback canceler accordingly. In order to detect the onset of feedback, the signals B and E are generated as described above, and cross-correlation of the B signals 148 and E signals 110 are calculated as follows:

$$BEProdSum_k(n) = \sum_d E_k(n) \cdot B_k^*(n-d) \tag{4}$$

It is noted that the calculation of $E_k(n) \cdot B_k^*(n-d)$ is already being calculated during the processing when the coefficients W are updated as described regarding equations (2) and (3) above. Accordingly these calculations are used for the cross-correlation product sums in equation (4) above without the need for any additional processing time, complexity or power. The values are summed up, per bin, in their complex expressions, to provide $BEProdSum_k(n)$. The current time stamp of the calculation is represented by ‘n’, and ‘d’ is the delay. For example, the last four samples may be calculated in the summation so that d=0, 1, 2, 3. Of course, this is not limiting, as other numbers of samples may be used (greater than or less than four). Further alternatively, every other delay sample may be calculated, such that d=0, 2, 4, 6. Other variations of the delay samples used are also possible e.g., every third delay sample, or some other sequence).

Next the magnitude squared (BEMag) of the product sum can be calculated as follows:

$$\begin{aligned} BEMag_k(n) &= \|BEProdSum_k(n)\|^2 \\ &= [\mathrm{real}(BErodSum_k(n))]^2 + \\ &\quad [\mathrm{imag}(BEProdSum_k(n))]^2 \end{aligned} \tag{5}$$

Alternatively magnitude, rather than magnitude squared could be used, by taking the square root of equation (5). The following equations used magnitude squared, but could alternatively use magnitude in their calculations. Other calculations can also be used to approximate the magnitude of this complex value.

Normalization (BENorm) of the magnitude squared (BEMag) can be calculated as follows:

$$BENorm_k(n) = \frac{BEMag_k(n)}{\|A_k(n)\|^4 \cdot [G_k(n)]^2} \tag{6}$$

where:

$G_k(n)$=forward gain, from input signal A (108) to output signal 126 (equivalently A to B), of subband k at time n.

Note that if the complex magnitude of BEMag is calculated, instead of the complex magnitude squared as shown in equation (5), then the denominator of the normalization equation for the complex magnitude would be the square root of the denominator shown in equation (6).

Next the normalized BENorm is used to form smoothed value BESmooth:

$$BESmooth_k(n)—\beta\cdot BENorm_k(n)+(1-\beta)\cdot BESmooth_k(n-1) \quad (7)$$

where:

β is a time constant used to set the rate of smoothing in the filtering operation. In one example, β was set to 0.125 ($2^{-3}$), but this is programmable and may vary. For example, $2^{-4}$, $2^{-5}$, or some other value could be substituted for β, which may be empirically determined. Other fractional numbers with more precision could also be used. For example, the value of β could be some other power of 2 or another fractional number less than positive one and greater than zero (numbers that can be represented in the fixed point domain, wherein there are a finite number of bits). The initial value of $BESmooth_k(0)$ is usually set to 0.

The BESmooth values are summed to provide a value of metric BEFast (an overall measure of all bins' feedback path changes) as follows:

$$BEFast(n) = \sum_k BESmooth_k(n) \quad (8)$$

and metric BESlow is calculated as a function of BEFast and the previous BESlow. BESlow represents the average of BEFast and can also be thought of as the long-term trend of BEFast. BESlow can be calculated as follows:

$$BESlow(n)=\gamma\cdot BEFast(n)+(1-\gamma)\cdot BESlow(n-1) \quad (9)$$

where: γ is a time constant used to set the rate of smoothing in the filtering operation. The time constant γ is usually selected before carrying out calculations and is programmable. In one embodiment, the value of γ was $2^{-13}$, but this value could be some other power of 2 or another fractional number less than positive one and greater than zero (numbers that can be represented in the fixed point domain, wherein there are a finite number of bits). The initial value of BESlow(0) is usually set to 0.

The metric BEAll is a normalized, zero-mean measure of the feedback path changes across all bin and is calculated as the difference between BEFast and BESlow:

$$BEAll(n)=BEFast(n)-BESlow(n) \quad (10)$$

In this example, the metric BEAU is compared to a threshold value (BEThresh) to detect whether or not a feedback path change recently has or is occurring. The selection of the adaptation rate μ(n) is determined by the comparison of BEAll to BEThresh. That is,

```
If BEAll(n) ≥ BEThresh,
   Then μ(n) = Fast_Value;
Else
   μ(n) = Slow_Value.
```

This means this means that a feedback path change is detected when BEAll(n) is greater than or equal to BEThresh and the adaptation rate that is applied or maintained to the adaptive feedback canceler is the fast value. Thus, the fast value of μ(n) would be applied in equation (2) or (3) above to update the W coefficients applied to adapt the feedback canceler. The fast value of μ(n) in at least one example, was $2^{-4}$, but may vary and range from $2^{-2}$ to $2^{-8}$, typically from about $2^{-3}$ to $2^{-7}$. Further, these values are exemplary only and do not limit the present invention, as other values could potentially be used for the fast value. If BEAll(n) is less than BEThresh, this means that feedback path change is not detected and therefore the slow value for rate μ(n) is applied or maintained to the adaptive feedback canceler. The slow value of μ(n) in at least one example, was $2^{-9}$, but may vary and range from $2^{-7}$ to $2^{-15}$. The BEThresh value is programmable, and can be empirically determined. In at least one example, a BEThresh value of 15.0 (in the log2 domain, i.e., $2^{15}$) was used and in at least one other example, a BEThresh value of 16.0 (in the log2 domain, i.e., $2^{16}$) was used. Typically the BEThresh value is selected within the range from 10.0 to 20.0 although the value may be greater than 20.0 or less than 10.0. Alternatively, the adaptation rate μ(n) may vary continuously, becoming faster as BEAll(n) increases, once a feedback path change is detected.

Thus the present invention provides a novel measurement (metric) which is useful in determining when a tonal signal is due to feedback, versus when it is coming from the desired input (environmental sounds) by detecting when a feedback path change occurs. The desired input refers to environmental sounds that are not due to feedback, and are the sounds that are intended to be picked up by the hearing device and output to the user/listener. Preferably the control unit comprises a feedback detector capable of identifying whether or not a tone is an external tone (or due to feedback).

The metric is used to set the value of the μ(n) adaptation rate such that adaptation is slow when the metric is low (relative to a threshold value), and sets the value of μ(n) such that adaptation is fast (relative to the slow adaptation) when the metric is high (e.g., greater than or equal to the threshold value).

The BEProd metrics described above (BEAll(n), BEFast (n) and BESlow(n) can be used as a robust feedback onset detector that rejects signals normally mistaken for feedback, such as music, tonal speech, clicks, whistles, and pure tones. The BEProdSum values can be thought of as the combined proposed response, centered in the subband, that are also used in the coefficient update calculations to modify the feedback canceler coefficients. This provides efficiency in the calculations, as the products are only calculated once, then used both for the BEAll metric and the coefficient updates.

The normalization by $A_k(n)^4$ is significant, as when feedback is present, as the input carries that information. The amount of feedback in A is generally reduced by the subtraction of the anti-phase feedback canceler signal 142 to create E (110), especially as the feedback canceler adaptive filter 152 adapts to the feedback. Hence, normalization by E (and hence by B, which is a gained-up version of E) is not sufficient to generate discrimination of feedback vs. other signals.

Note that the output signal per subband, in magnitude, is:

$$|B_k(n)|=G_k(n)\cdot|E_k(n)| \quad (11)$$

The forward gain values G are time-varying gains (always positive). Hence, in the magnitude, the product (numerator of $BEMag_k(n)$) can be thought of as:

$$BEMag_k(n)\propto|E_k(n)|^2\cdot|B_k(n)|^2=|E_k(n)|^2\cdot|G_k(n)\cdot E_k(n)|^2=[G_k(n)]^2\cdot|E_k(n)|^4 \quad (12)$$

Therefore, since A≈E except for feedback differences, normalization by $|A_k(n)|^4\cdot G_k(n)^2$ is useful to remove a large part of the dependence of this metric upon signal level and upon gain. However, because this is not perfect, the BESlow (n) trend is subtracted from the combined signal BEFast(n).

In some embodiments, as described above, all subband signal samples are processed as described to detect whether or not feedback path change occurs, and results of the processing are used to determine whether to apply (or maintain) a fast or slow adaptation rate. Alternatively, a subset of the total number of subbands of the signals (less than the total number of subbands k) can be processed for use in calculating BEFast(n). For example, the subbands from frequencies in which feedback is most likely to be found may be processed, while ignoring those less likely to have feedback. For example, ignoring lower frequency subbands where music and speech tend to exist may help the differentiation between these desired tones and feedback tones. In one non-limiting example, out of thirty-two bins (subbands), bins 6 through 27 were used for calculating BEFast(n) and bins 0-5 and 28-31 were not used. This effectively excludes consideration of the frequencies from DC to 1250 Hz and also above 7000 Hz. Of course the present invention is not limited to this selection, as fewer or more or all bins could be used in the calculation, and different bins than those noted could be used, while excluding some of those described as having been used in that example.

Further alternatively, the number of the above values calculated per set of new subband samples can be decimated (e.g., not all subbands need to have their calculations done each time). For example, the subbands (bins) can be updated at a 2 kHz rate, while the feedback canceler (FBC) coefficients are updated at a different rate. In one non-limiting example the subbands were updated at a 2 kHz rate and the FBC coefficients were updated at a 500 Hz rate. The contribution of the bins sued for calculating to BEAU was also updated at a 500 Hz rate. It is further noted that this specific example is non-limiting, as many other rates could be used.

The divisions can be done, all or in part, by using power of 2 estimates and shifting. For example, in equations (2), (3) and (6) above, the denominator is usually approximated to the closest power of two, and the divide operation can be carried out with a bit shift.

Optionally, the smoothing time constant β (e.g., see equation (7)) can be performed using power-of-two shifts. This likewise applies to time constant γ (e.g., see equation (9)) and constant α (e.g., see equation (3)). The time constant can be applied either with a higher-precision multiply, or with a right shift by the power of two. For example, if the value used for β is $2^{-6}$, then a right shift by 6 bits is used to effectively do the multiplication.

The values of BEFast(n) and BESlow(n) can optionally be delayed slightly and independently without hampering the calculations which depend on them and their past values. For example, when calculating BEFast(n) (see equation (8) above), the delay can be performed by substituting $BESmooth_{(k)}(n-1)$ for $BESmooth_{(k)}(n)$. Similarly, when calculating BESlow(n) (see equation (9) above), the delay can be performed by substituting BEFast(n−1) for BEFast(n). Note that this alternative is only exemplary and is not limited to delaying by one sample as noted, For example, the delay may be 2 samples (n−2) or some other number, but a 2 sample delay is currently not typically exceeded when using a 2 KHz sample rate. Thus, even with other sampling rates a delay time range from about 0.5 to 1.0 msec can typically be used. However, delay time could be from greater than 0 msec to 1.0 msec or from greater than 0 msec to 1.5 msec. The time delay for calculation of BEFast(n) can be the same or different from the time delay for calculation of BESlow (n).

The adaptation rate μ(n) value can be maintained in application to the adaptive feedback canceler (adaptive feedback cancellation filter) 140, so as to persist for some time after detection of the onset of feedback to ensure complete adaptation/convergence of the FBC filter 140 in canceling the feedback. In embodiments where BEAll(n) is compared to a threshold value to detect the onset of feedback, the adaptation rate can be maintained so as to persist for a time period ranging from 0 msec to 4 sec, or 100 msec to 3 sec, typically from 200 msec to 2 sec.

As noted above, the value of BEAll(n) can be used alternatively to gradate μ(n). For example, gradation can be performed by relating μ(n) as proportional to BEAll(n) BEScale; where BEScale is programmable and might vary from 0.1 to 1.0. In embodiments where μ(n) s gradated proportionally to BEAll(n), there may also still be a lower threshold below which it is considered that a feedback path change is not currently occurring and therefore μ(n) is set to a predetermined slow value. However, when BEAll(n) is greater than or equal to the threshold value, then μ(n) is set to a value proportional to BEAll(n) as noted above. The following is a non-limiting example to further describe the method of gradating μ(n) proportional to BEAll(n). As noted the scaling values may vary from that given in the example. Likewise the threshold value, as well as value for the slow value of μ(n) may vary:

$$\text{If } (BEAll(n)<10.00) \text{ then } \mu(n)=2^{-4}$$

$$\text{Else } \mu(n)=2^{--}*2^{(BEAll(n)-10.0)*0.5}$$

where, in this example, BEThresh=10.0. Alternatively, below describes carrying out the calculations in right shifts:

$$\text{If } (BEAll(n)<10.0) \text{ then } \mu(n)\_shift=9$$

$$\text{Else } \mu(n)\_shift=9-\text{round}((BEAll-10.0)*0.5)$$

Where, in this Example, BEThresh=10.0

Therefore, in this example, if BEAll(n)=20, μ(n)_shift=9−(20-10)*0.5=4.

The detection of feedback path changes using BEAll(n) can optionally be used to reduce gain, either broadband or in the bins (subband), to reduce the squeal associated with the onset of feedback. The value of $BESmooth_k(n)$, calculated per bin, can also be used for each bin, as an indication of when to reduce gain.

Optionally the calculation of BESlow(n) (see equation (9) above) can be switched off during times of high excursions of BEAll(n), as such high excursions are generally indicative of either feedback or pure tones. It may be desirable to not allow these signals to affect the signal average represented by BESlow(n). This may be gated by a threshold, for example, when BEAll(n) "jumps" by a large amount (sufficient to exceed the threshold BEThresh), either negative for pure tones or clicks, or positive for feedback path changes, then updating of the BESlow value can temporarily be halted so that the excursions in BEAll(n) can be brought back to the previous neighborhood of BEAll(n) prior to the onset of feedback. In such instance, the updating of BESlow may be halted, as noted, leaving it at its value prior to the onset of the excursion. Once the value of BEAll(n) returns to a level below BEThresh, or at a predetermined delay time after BEAll(n) returns to a level below BEThresh, the update of the value of BESlow can resume.

EXAMPLES

The following examples are put forth so as to provide those of ordinary skill in the art with a complete disclosure and description of how to make and use the present invention, and are not intended to limit the scope of what the inventors regard as their invention, nor are they intended to represent that the experiments below are all or the only experiments performed. Efforts have been made to ensure accuracy with respect to numbers used (e.g. time, magnitude, etc.) but some experimental errors and deviations should be accounted for. All Examples were simulations performed on MATLAB® to demonstrate the usefulness of the BEAll metric for detecting when a feedback path change is present in a signal and when it is not. In these simulations, the start-up period (e.g. from zero up to about 1.5 seconds) allows for settling of the metrics. In actual implementation of the present invention, a lock-out period is enforced that allows the metrics to settle. In Example 5 where a feedback path change is detected, the signal from Example 5 is used again in Example 6 when using BEAll(n) to modify μ(n), to show the effectiveness of this in removing the feedback.

Example 1

Figure 3:
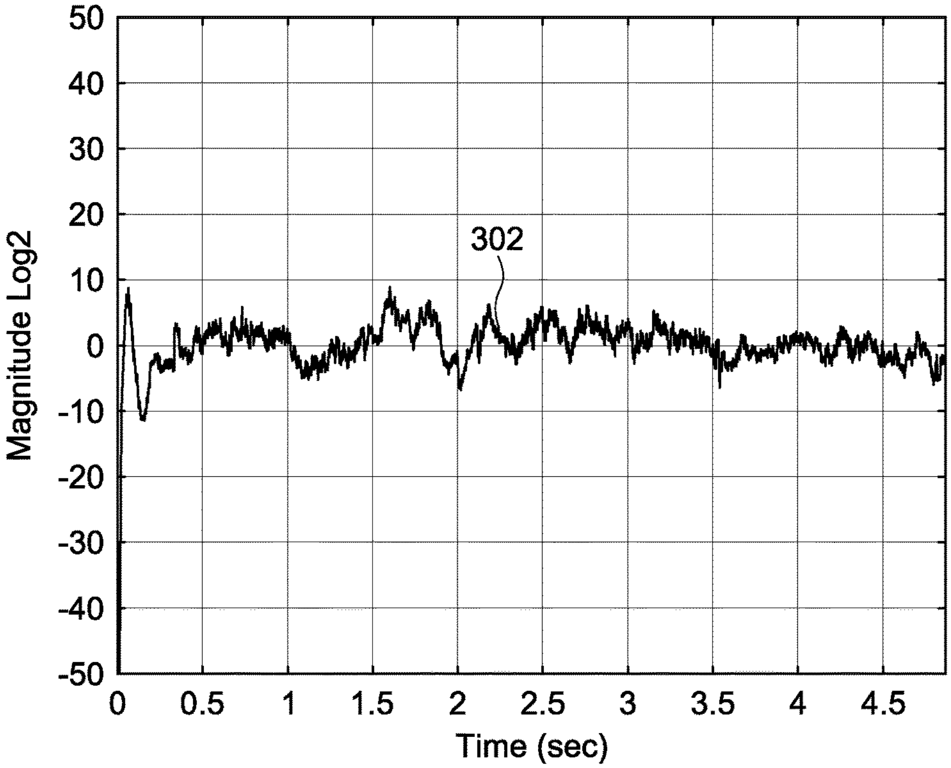
FIG. 3 is a plot of a BEAll metric resulting from a simulation using music as an input, according to an embodiment of the present invention.

FIG. 3 plots the magnitude of the BEAll metric against time, in seconds. BeAll(n) is labeled as reference numeral 302. In this example, the value of BEAll never equaled or exceed the value of BEThresh (BEThresh was set to a $\log_2$ value of +16.0 in this example, as well as in the examples referencing FIGS. 4-8) and therefore feedback path change was not detected and μ(n) was maintained at the slow rate over the entire 5 second duration of this example. The value of β used for calculating BESmooth was $2^{-3}$, and the value of y used for calculating BESlow was $2^{-13}$ for this example and the examples referencing FIGS. 4-8. Example 1 shown in FIG. 3 used music as input. The music inputted was a new age piano solo title "Joy", by George Winston, which includes multiple segments of single notes, i.e., pure tones. The maximum value of the signal was down −23 dB from full scale. FIG. 3 shows that the metric 302 stays well below the threshold value of +16.0 throughout the duration of the experiment and therefore feedback onset was not detected.

Example 2

Figure 4:
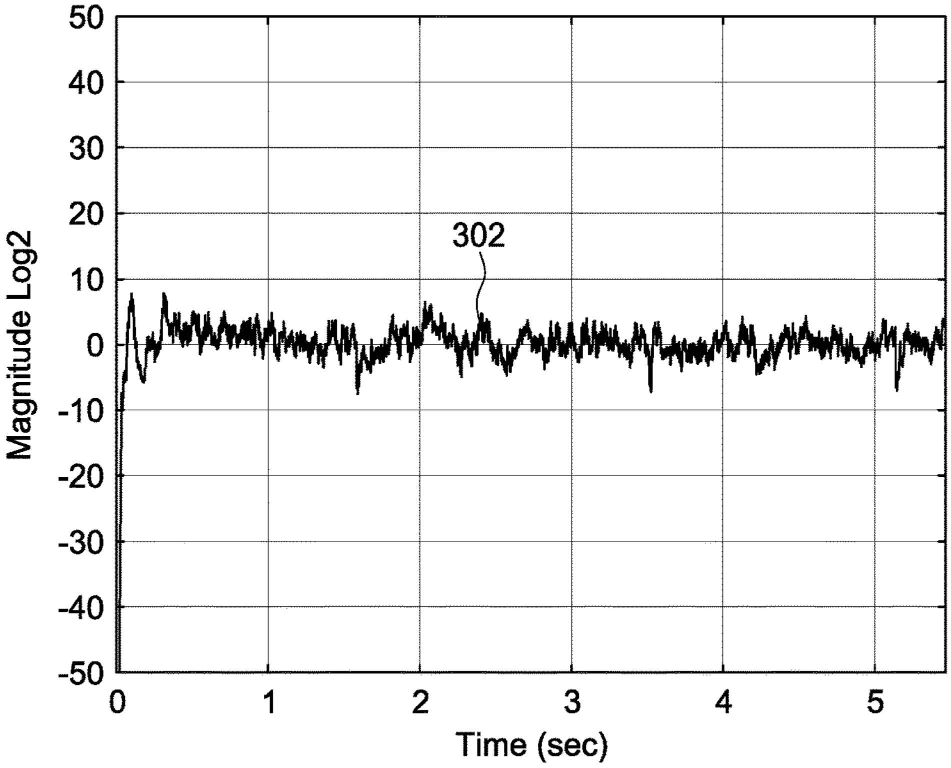
FIG. 4 is a plot of a BEAll metric resulting from a simulation using human speech as an input, according to an embodiment of the present invention.

FIG. 4 shows the BEAll metric 302 in a simulation where the signal analyzed is human speech. After the start-up period (e.g. from zero up to about 1.5 seconds) has passed to allow for settling of the metrics, it can be observed in FIG. 4 that the value of BEAll metric 302 never equals or exceeds the BEThresh value of +16.0, therefore feedback path change is not detected and the slow rate for μ(n) was maintained throughout the duration of this experiment. Thus, the metric 302 is able to distinguish the tonal parts of human speech from feedback and the tonal parts of the speech do not cause the metric 302 to equal or exceed the threshold value.

Example 3

Figure 5:
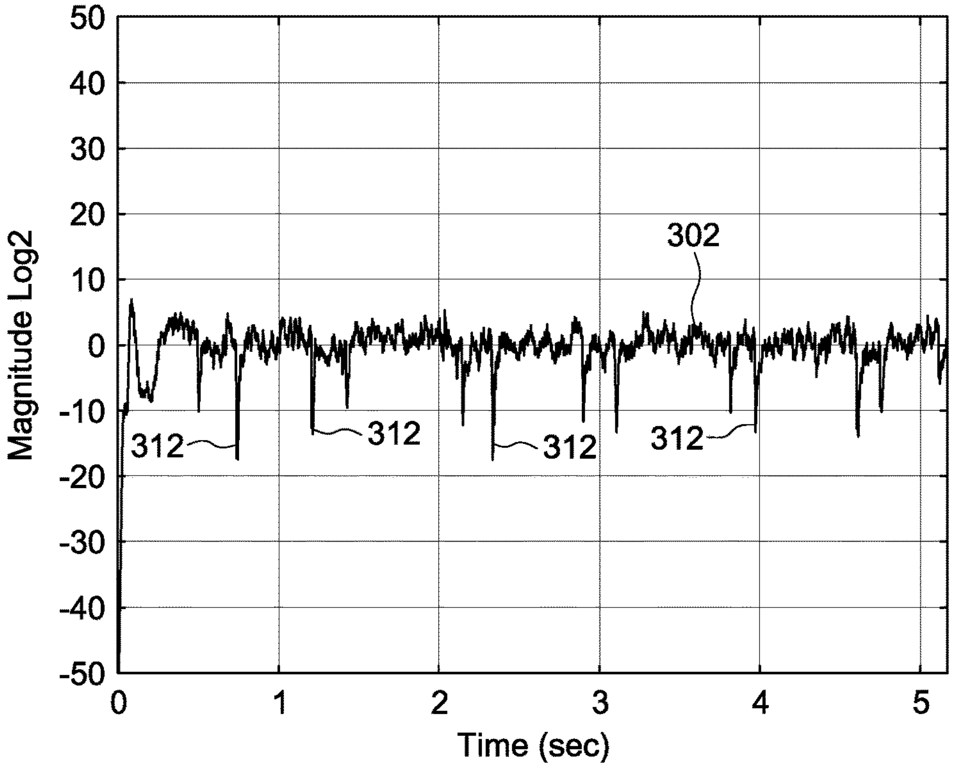
FIG. 5 is a plot of a BEAll metric resulting from a simulation using sounds made by "clicking" a retractable ball point pen as an input, according to an embodiment of the present invention.

FIG. 5 shows the BEAll metric 302 in a simulation where the signals analyzed are the sounds made by "clicking" a retractable ball point pen when the pen is actuated to repeatedly extend and retract the ball point of the pen. The impulsive sounds produced by the pen clicks are shown by the downward spikes 312 in the plot. The downward spikes 312 resulting from the clicks are correctly interpreted and are not identified as feedback path change, as only positive values greater than or equal to the threshold value (+16.0 in this example) are recognized as feedback path change. Therefore the slow rate for μ(n) was maintained throughout the duration of this experiment, since the metric 302 never equals or exceed the threshold value.

Example 4

Figure 6:
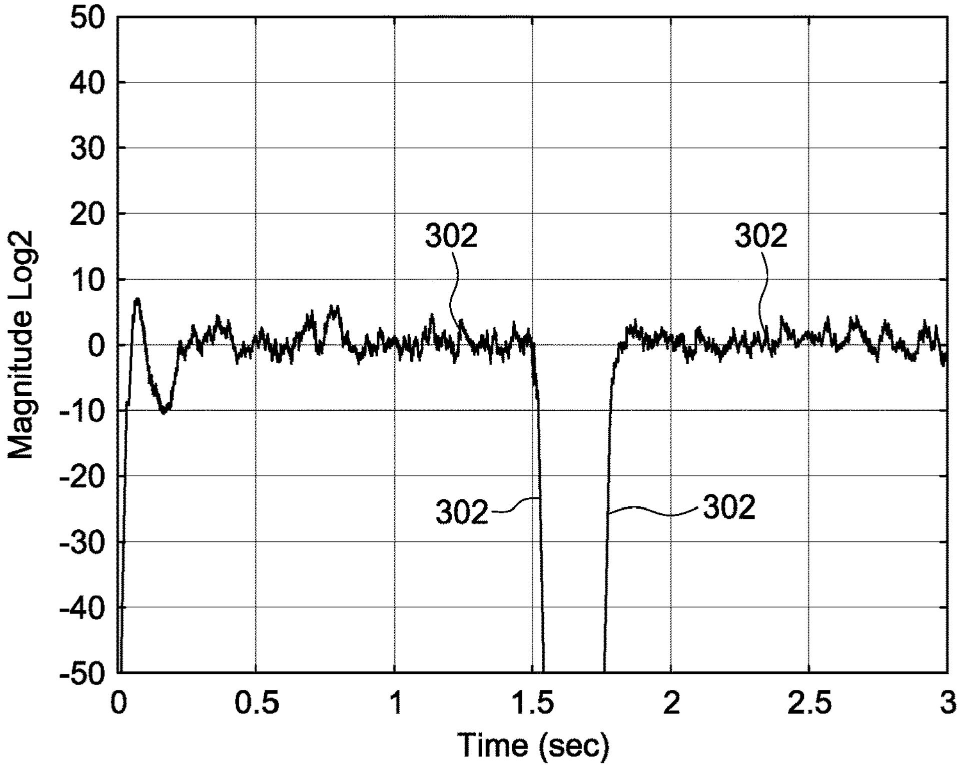
FIG. 6. is a plot of a BEAll metric in a simulation where the signal analyzed is a pure tone, according to an embodiment of the present invention.

FIG. 6 shows the BEAll metric 302 in a simulation where the signal analyzed is a pure tone. A 3 kHz tone was used starting at 1.5 sec and lasting for 250 msec. The tone was down −34 dB from full scale. The noise before and after the tone was down~−68 dB from full scale. Starting at just after about 1.5 seconds, FIG. 6 the metric 302 shows a strong negative drop in level at which then returns to baseline shortly after cessation of the pure tone input. The BEAll metric 302 never goes high, only low, hence never crosses the feedback path change detection threshold. Therefore the slow rate for μ(n) was maintained throughout the duration of this experiment, since a feedback path change was not detected.

Example 5

Figure 7:
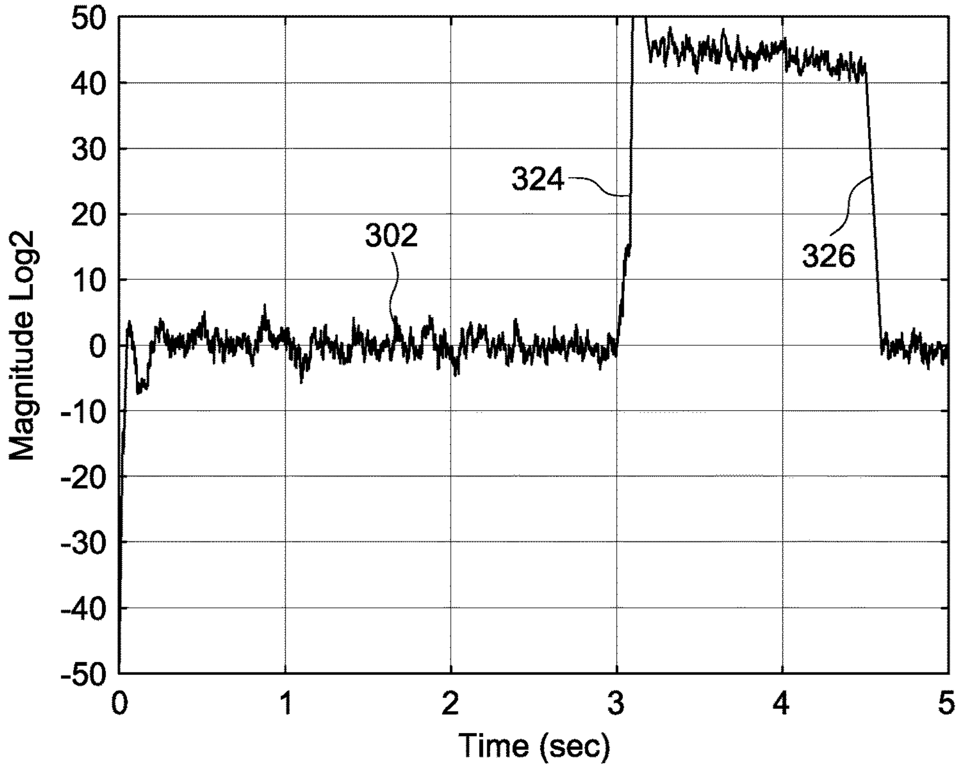
FIG. 7 is a plot of a BEAll metric in a simulation where the signal analyzed is white noise with feedback path changes, according to an embodiment of the present invention, where the feedback cancellation system has not used a metric of the present invention to switch to a fast adaptation rate, hence feedback is not being cancelled.

FIG. 7 shows the BEAll metric 302 in a simulation where the signal analyzed is white noise with feedback path changes, but in which the BEAll metric 302 was noted but not used to switch the adaptation rate μ(n) to the fast rate or a gradated rate. Thus, the adaptation rate μ(n) was maintained at the slow rate over the duration of the experiment. Feedback path changes were simulated by switching between two different filters during the course of the five second run time of the experiment. There was a first feedback path established at the beginning by white noise inputted with the output fed back in simulation through an example filter. A feedback path change was then established at 3 seconds Two different filters were used to simulate two different acoustic feedback paths of the system, with the first filter used at time=0 to three seconds, and then the second filter was used at three seconds to 4.5 seconds, with a change back to the first filter after that. The two filters were generated by measuring the quiescent feedback impulse response with a hearing aid in the ear for the first filter, and then by putting a hand next to the ear to change the acoustic reflections generating the feedback to make the second filter.

The feedback path changes were inputted to the simulation at 3.0 seconds (changing from first filter to second filter) and 4.5 seconds (changing from the second filter back to the first filter). FIG. 7 shows the effects of the feedback cancellation system 140 when it does not use the BEAll metric to switch the adaptive rate μ(n) to fast. The feedback persists at 324 from the time that the feedback path is changed at 3.0 seconds, until after the 4.5 second 326 after the second feedback path change is made at 4.5 seconds. Thus, the feedback is never significantly corrected until the second filter is removed and the feedback path is restored to the original path represented by the first filter. Feedback is essentially being cancelled when the BEAll metric returns to small fluctuations around zero, as enough feedback is being canceled so as to not be audible.

Example 6

Figure 8:
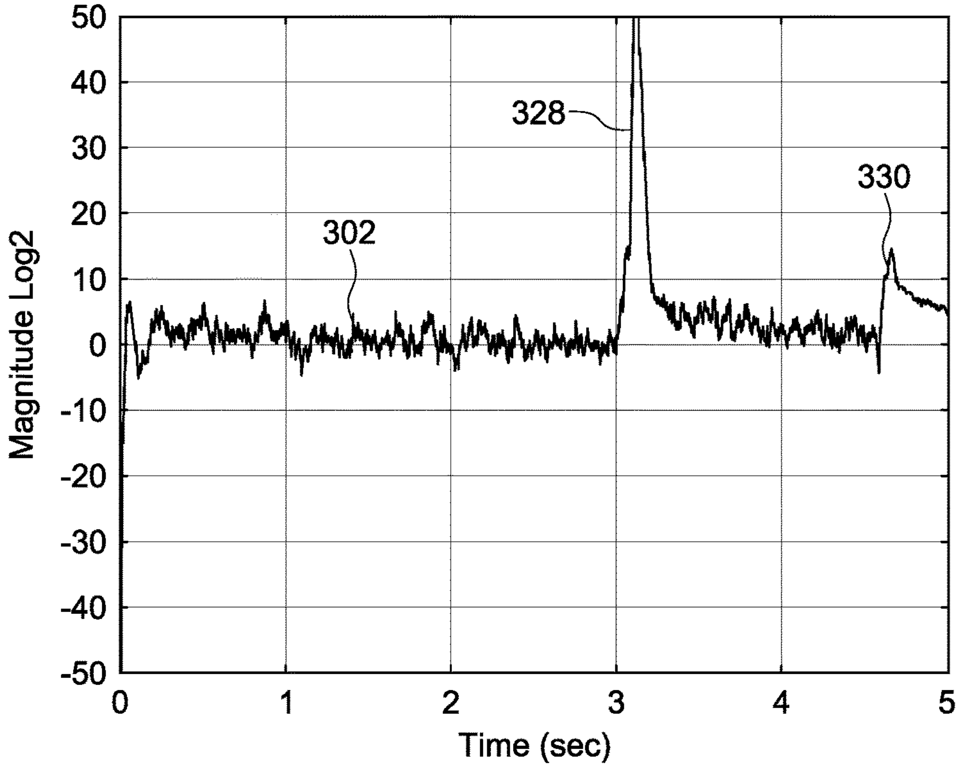
FIG. 8 is a plot of a BEAll metric in a simulation where the signal analyzed is white noise with feedback path changes, according to an embodiment of the present invention, where the feedback cancellation system has used a metric of the present invention to switch to a fast adaptation rate. This shows the resulting cancellation of the feedback signal.

FIG. 8 shows the BEAll metric 302 in a simulation where the signal analyzed is the same as that which was applied in Example 5 (i.e., the same white noise with feedback path changes). The difference between Example 6 and Example 5 is that in Example 6, the outcome is shown when the metric BEAll(n) is used to modify adaptation rate μ(n) when feedback path change is detected.

When the feedback path changes at 3.0 seconds, the spike 328 in BEAll(n) caused by the change, causes BEAll(n) to become greater than or equal to the threshold value BEThresh (i.e., greater than +16.0, for this example). This results in the adaptation rate μ(n) being switched to be faster, so that the fast value of μ(n) is applied in equation (2) or (3) above to update the W coefficients applied to adapt the feedback canceler such that the feedback is much more rapidly canceled. Thus at 3.0 seconds, μ(n) becomes fast and is held at the fast value for 400 msec. It then goes back to being slow, until the second path change at 4.5 sec, at which time it again becomes fast and is held at the fast value for 400 msec before returning to its slow value.

As shown in FIG. 8, the introduction of the feedback causes the initial pulse 328 in the BEAll metric and then the BEAll metric returns back toward the baseline level and well under the threshold value of +16.0 with no feedback almost immediately as the feedback canceler is applied with the fast adaptation rate μ(n). A similar occurrence is shown at around 4.5 second, where impulses 330 is almost immediately brought back down to a level below the threshold value as the feedback is canceled. Upon returning to the levels where feedback is effectively canceled, the return to the normal levels in the metric BEAll(n) are to levels that are less than the threshold value BEThresh and the system will then switch the adaptation rate μ(n) back to the slow rate. In this example, at the onset of feedback detected when spike 328 occurs, the fast adaptation rate μ(n) was applied for 400 msec at the onset of feedback, and then was changed back to the slow adaptation rate μ(n) after the 400 msec. Then, at 4.5 sec when the feedback path was changed again, the fast adaptation rate μ(n) was again applied at the newly detected onset of feedback, and was applied for 400 msec before being replaced by the slow adaptation rate value.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, component, apparatus, composition of matter, process, process step or steps, to the objective, spirit and scope of the present invention. All such modifications are intended to be within the scope of the claims appended hereto.

That which is claimed is:

1. A method of signal processing an audio signal in a hearing device to detect when feedback path change occurs, the hearing device including a receiver and a microphone, the method comprising:

detecting whether a tonal signal is due to feedback onset by estimating a product of a subband error signal and a subband output signal generated in response to a subband audio input signal;

estimating a metric based upon the estimated product; and detecting that said feedback path change occurs when the metric is greater than or equal to a predetermined threshold value.

2. The method of claim 1, wherein the metric is estimated by estimating a fast metric based on the estimated product and estimating a slow metric, and taking the difference between the fast metric and the slow metric.

3. The method of claim 2, wherein estimation of the slow metric is not performed when the absolute value of the fast metric exceeds a predetermined value.

4. The method of claim 2, further comprising applying or maintaining an adaptation rate to the adaptive feedback canceler of the hearing device, wherein the adaptation rate applied or maintained is based upon a value of the difference between the fast and slow metrics.

5. The method of claim 1, wherein said estimating and said detecting are performed by a processor connected to the microphone and the receiver.

6. The method of claim 5, further comprising applying or maintaining an adaptation rate to the adaptive feedback canceler of the hearing device, wherein the adaptation rate applied or maintained is based upon a value of a difference between a fast metric based on the estimated product and a slow metric.

7. A method of signal processing an audio signal in a hearing device to detect when feedback path change occurs and controlling an adaptive feedback canceler to remove the feedback, the hearing device including a receiver, a processor and a microphone, the method comprising:

detecting whether a tonal signal is caused by feedback path change; estimating a metric based upon calculations performed during said detecting; and applying or maintaining an adaptation rate to the adaptive feedback canceler of the hearing device, wherein the adaptation rate applied or maintained is based on a value of the metric.

8. The method of claim 7, wherein the adaptation rate applied when it is detected that the tonal signal is caused by feedback path change is a relatively fast adaptation rate.

9. The method of claim 7, wherein the adaptation rate applied when it is detected that the tonal signal is not caused by feedback path change a relatively slow adaptation rate.

10. The method of claim 7, wherein the said detecting is performed by the processor estimated a product of a subband error signal and a subband output signal generated in response to a subband audio input signal.

11. The method of claim 7, wherein the metric is used to gradate a value of the adaptation rate by scaling the value of the adaptive rate according to a value of the metric.

12. The method of claim 7, wherein the metric comprises fast and slow metrics, and wherein the adaptation rate applied or maintained is selected based upon a value of the difference between the fast and slow metrics compared to a threshold value.

13. The method of claim 12, wherein it is detected that feedback path change occurs when the difference between the fast metric and the slow metric is greater than or equal to the threshold value.

14. The method of claim 13, wherein the adaptation rate applied when it is detected that feedback path change occurs is proportional to the value of the difference between the fast and slow metrics.

15. A hearing device comprising:

a microphone;

a receiver; and a processor connected to said microphone and said receiver, said processor configured to receive audio signals from said microphone and process the audio signals and said receiver configured to provide output signals to a user, the processor further configured to:

detect whether a tonal signal is due to feedback onset by estimating a product of a subband error signal and a subband output signal generated in response to a subband audio input signal; and estimate a metric based upon the estimated product;

wherein it is detected that said feedback path change occurs when the metric is greater than or equal to a predetermined threshold value.

16. The hearing device of claim 15, wherein the metric is estimated by estimating a fast metric based on the estimated product and estimating a slow metric, and taking the difference between the fast metric and the slow metric.

17. The hearing device of claim 15, wherein processor applies or maintains an adaptation rate to the adaptive feedback canceler of the hearing device, wherein the adaptation rate applied or maintained is based upon a value of a difference between a fast metric based on the estimated product and a slow metric.

18. The hearing device of claim 17, wherein it is detected that feedback path change is considered to not occur when the difference between the fast metric and the slow metric is less than the threshold value.

19. The hearing device of claim 15, wherein the product of a subband error signal and a subband output signal generated in response to a subband audio input signal is estimated for each subband of the audio signal having been split into a plurality of subbands.

20. The hearing device of claim 15, wherein the product of a subband error signal and a subband output signal generated in response to a subband audio input signal is estimated for less than a total number of a plurality of subbands of the audio signal having been split into the plurality of subbands.

* * * * *